Feb. 27, 1951 H. D. DOOLITTLE 2,543,445

IMPULSE GENERATING APPARATUS

Filed Aug. 1, 1945

INVENTOR
HOWARD D. DOOLITTLE
BY William D. Hall
ATTORNEY

Patented Feb. 27, 1951

2,543,445

UNITED STATES PATENT OFFICE 2,543,445

IMPULSE GENERATING APPARATUS

Howard D. Doolittle, Cambridge, Mass., assignor, by mesne assignments, to the United States of America as represented by the Secretary of War Application August 1, 1945, Serial No. 608,290

5 Claims. (Cl. 250—27)

This invention relates to electrical circuits and more particularly to circuits for producing pulses of varying widths.

In many radio applications it is necessary to produce pulses of very high amplitude and very short time duration. One example of the use of these pulses is in the operation of high frequency oscillators of the magnetron type. Magnetron oscillators are usually made operative by a negative voltage pulse of an amplitude greater than ten kilovolts and of a time duration that ranges from a fraction of a microsecond to several microseconds. One convenient means for forming such pulses is to use pulse forming lines. One of the disadvantages of pulse forming lines, however, is that the width of the pulse cannot easily be varied.

It is an object of the present invention, therefore, to provide a simple, novel circuit employing pulse forming lines or networks for producing voltage pulses of varying time duration.

In accordance with the present invention there are provided a power supply means, a pulse forming network and a load, all connected in a series combination. A plurality of switch means is provided for initiating and terminating a pulse that is applied to said load.

For a better understanding of the invention, together with other and further objects thereof, reference is had to the following description taken in connection with the accompanying drawing in which.

Figure 1:
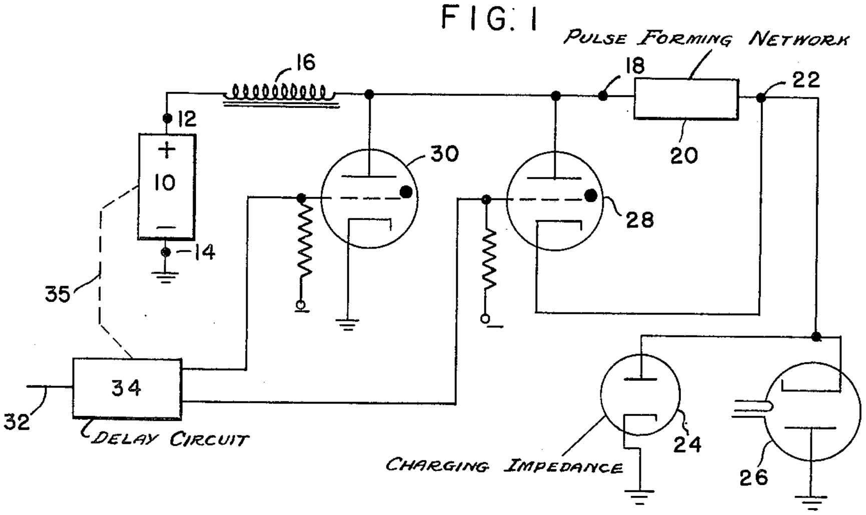
Fig. 1 is a schematic wiring diagram of the invention.

Referring now more particularly to Fig. 1, there is shown a source of direct-current potential 10 having a positive terminal 12 and a negative terminal 14. Terminal 14 is connected to ground as shown in Fig. 1 while terminal 12 is connected through an inductor 16 to a terminal 18 of a pulse forming network 20. Potential source 10 may be any of the types of variable potential sources known in the art, but a grid controlled rectifier is especially suited for this invention. A second terminal 22 of pulse forming network 20 is connected to ground through a charging impedance 24. Impedance 24 may be a suitably connected diode or any other suitable impedance. A magnetron oscillator 26 is connected from terminal 22 to ground in a manner shown in Fig. 1. A grid controlled gas triode 28 of the type known to the art as a thyratron is connected between terminals 18 and 22 of network 20. A second thyratron tube 30 is connected between terminal 18 and ground. Signal input 32 provides means for introducing a control pulse while delay circuit 34 provides means for delaying the control pulse that is applied to tube 28 by varying amounts selected by the operator without delaying the control pulse applied to tube 30. Dotted line 35 represents schematically a connection between the delay control in circuit 34 and the voltage control in source 10. The reason for this connection will be explained presently.

Pulse forming network 20 serves as a storage device in this circuit. In the interval between pulses, network 20 is charged through inductor 16 and impedance 24 so that terminal 18 is positive with respect to terminal 22. Direct current resonance charging is employed; therefore, the potential across network 20 will be approximately twice the potential of source 10. During this charging process tubes 28 and 30 are held cut off by a negative bias on their respective control grids. During this time magnetron 26 does not conduct since the cathode must be several kilovolts more negative than the anode before it will oscillate.

Figure 2:
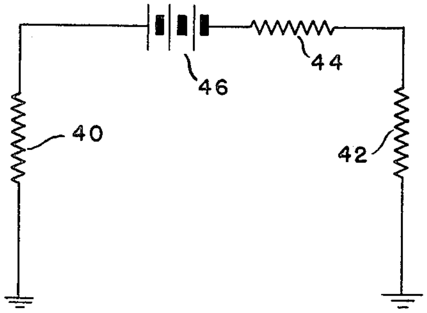
Fig. 2 shows a circuit that is approximately equivalent to the circuit of Fig. 1 at the beginning of the pulse.

If now a very short positive pulse is applied to the control grid of tube 30, this tube conducts and, therefore, reduces the effective impedance to ground from point 18 to a very low value. The cathode of magnetron 26 is now at a potential below ground that is approximately equal to the potential between terminals 18 and 22 of network 20. This negative potential causes magnetron 26 to oscillate. Current thereupon flows from terminal 18 of network 20 through tube 30 and magnetron 26 to terminal 22. An approximate equivalent circuit of this path is shown in Fig. 2. In Fig. 2 resistor 40 is the conducting resistance of tube 30, resistor 42 the oscillating resistance of magnetron 26, and resistor 44 the characteristic resistance of pulse forming network 20. Potential source 46 represents the energy stored in network 20. The effect of inductor 16 and impedance 24 may be neglected since the impedance of these two elements is large compared to the impedances shown in Fig. 2. Current continues to flow as described above for a predetermined time interval. This time interval depends on the constants of network 20. At the end of this time interval the circuit of Fig. 2 is changed in that potential source 46 is removed from the circuit.

Magnetron 26 oscillates during the period that potential is supplied by network 20. Once network 20 has discharged, tube 30 and magnetron 26 no longer conduct so that network 20 is recharged. The signal that was applied to the cathode of magnetron 26, therefore, was a negative pulse that began at the instant tube 30 was triggered and continued for a time interval determined by the constants of network 20. It is understood that to obtain this condition the pulse to tube 28 may be eliminated by adjustment of delay circuit 34 or the time delay of circuit 34 set equal to the pulse width as determined by network 20.

Figure 3:
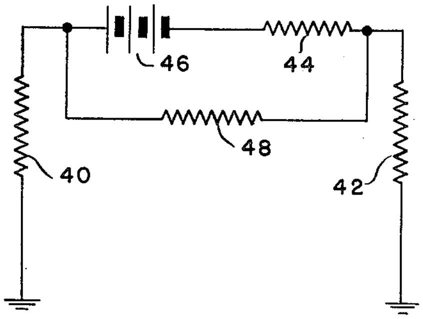
Fig. 3 shows a circuit that is approximately equivalent to the circuit of Fig. 1 at the end of the pulse.

The operation as just explained determines the maximum time duration of the pulse that may be obtained from this circuit. If a pulse of shorter duration is desired, tube 30 is triggered in the manner described above, and after a time interval equal to the desired time duration of the pulse to be applied to the magnetron, a second short positive pulse is applied to the control grid of tube 28. The time interval between the two pulses is, of course, determined by circuit 34. When tube 28 conducts, network 20 is shunted by the low impedance of tube 28. This impedance is represented by resistor 48 in Fig. 3. It can be seen that very little voltage will appear across resistor 42 if resistor 48 is much smaller than resistor 42. Comparing the circuit of Fig. 3 with the circuit of Fig. 1, it can be seen that if the conducting impedance of tube 28 is much less than the oscillating impedance of magnetron 26, the pulse that is applied to magnetron 26 is for all practical purposes terminated at the time that the positive trigger is applied to tube 28. The energy that was stored in network 20 at the time of the second pulse is not wasted, however, since the behavior of a pulse forming network is such that current will flow in such a direction as to make terminal 18 of network 20 more negative than terminal 22. If network 20 were allowed to charge now with the same potential supplied by source 10, it would charge to a higher potential than formerly, the amount of rise depending on the amount of energy stored in network 20 at the time tube 28 fires. To prevent network 20 from charging to a higher potential, the potential of source 10 is reduced by the proper amount. The connection illustrated by line 35 may be such that the potential supplied by source 10 is reduced fast enough every time that the delay caused by circuit 34 is shortened so that network 20 always charges to the same potential.

Some of the advantages of this circuit are:

(1) The pulse is formed by a relatively simple circuit employing a pulse forming network.

(2) The maximum length of the pulse is accurately controlled by the constants of the pulse forming network.

(3) Pulses may be initiated at any time by simply applying a control pulse of small amplitude at point 32 subject only to the condition that network 20 has sufficient time to charge between pulses, and (4) That the pulse may be terminated at any time prior to the maximum time duration by properly adjusting delay circuit 34. It should be understood that if direct current resonance charging is not employed, network 20 will charge only to the potential of source 10 so that under these circumstances the potential supplied by source 10 may be maintained constant. This may be done by removing the connection represented by line 35. The operation of the circuit not employing resonance charging will be essentially the same as the operation described above.

While there has been described what is at present considered the preferred embodiment of the invention, it will be obvious to those skilled in the art that various changes and modifications may be made therein without departing from the invention.

What is claimed is:

1. A pulse generating circuit comprising a pulse forming network and an output load in series combination, means for charging said series combination, a source for supplying a first pulse and a delayed second pulse in response to an input pulse, means connected to said source and responsive to said first pulse for initiating discharge of said network through said load, and means connected to said source and responsive to said second pulse for connecting a low impedance in shunt with said network.

2. A pulse generating circuit comprising an electrical storage means in series combination with a load responsive to electrical energy of one polarity, a first normally open low impedance switch means connected directly across said storage means, a high impedance source of electrical energy connected in the reverse polarity across said series combination to charge said storage means, a source responsive to an input pulse for producing a first control pulse and a delayed second control pulse, a second normally open low impedance switch means responsive to said first pulse for applying said second low impedance switch means across said series combination, whereby electrical energy of said one polarity is applied across said load by said electrical storage means, means responsive to said second pulse for rendering operative said first low impedance switch means across said electrical storage means, whereby the electrical energy is removed from said load.

3. A pulse generating circuit, comprising a source of direct current potential, a first charging impedance, a pulse forming network and a load, all connected in a series combination, a second charging impedance connected in parallel with said load; a first switch means responsive to a first control pulse and connected across the series combination of said source of direct current potential and said first charging impedance for shunting the series combination of said source of direct current potential and said first charging impedance. a second switch means connected across said pulse forming network responsive to a second control pulse for shunting said pulse forming network, said first and second switch means being normally open, a source for supplying said first control pulse and said second control pulse at a predetermined time interval thereafter, and means for applying said first control pulse to said first switch means and said second control pulse to said second switch means.

4. A pulse generating circuit as claimed in claim 3, further including means for adjusting said pulse source for effecting the delay time of the second control pulse.

5. A circuit for generating pulses having variable widths across an output load, comprising a direct current source of high potential, a first charging impedance, a pulse forming network and a magnetron in series combination; a charging impedance comprising a diode connected in parallel with said magnetron; a variable delay circuit for producing a first control pulse and a delayed second control pulse; a first thyratron switch means, normally open, connected across the series combination of said pulse forming network and said magnetron and responsive to said first control pulse for initiating a current pulse through said magnetron; a second thyratron switch means, normally open, connected across said pulse forming network and responsive to said second control pulse for terminating said current pulse through the magnetron by shunting the pulse forming network, said first and said second thyratron switch means having their grids coupled to said delay circuit for application thereto of said respective control pulses.

HOWARD D. DOOLITTLE.

REFERENCES CITED

The following references are of record in the file of this patent:

UNITED STATES PATENTS

| Number | Name | Date |
|---|---|---|
| 2,320,916 | Dawson | June 1, 1943 |
| 2,391,894 | Gorham | Jan. 1, 1946 |
| 2,394,389 | Lord | Feb. 5, 1946 |
| 2,405,070 | Tonks | July 30, 1946 |
| 2,405,552 | Blumlein | Aug. 13, 1946 |
| 2,428,616 | Clapp | Oct. 7, 1947 |